United States Patent
Gulati et al.

[11] 3,892,537
[45] July 1, 1975

[54] PRELOAD MEANS FOR CERAMIC SUBSTRATE IN EXHAUST GAS PURIFIERS

[75] Inventors: Suresh T. Gulati, Elmira; Henry E. Hagy, Painted Post; John S. McCartney, Corning, all of N.Y.

[73] Assignee: Corning Glass Works, Corning, N.Y.

[22] Filed: Nov. 28, 1973

[21] Appl. No.: 419,540

[52] U.S. Cl. ............................ 23/288 FC; 252/477 R
[51] Int. Cl. ........... B01j 9/04; B32b 3/20; F01n 3/14
[58] Field of Search .............. 23/288 F; 252/477 R; 138/148; 87/3, 8

[56] References Cited
UNITED STATES PATENTS

| 319,738 | 6/1885 | McKinney | 138/148 |
| 2,353,226 | 7/1944 | Driscoll et al. | 87/8 |
| 3,692,497 | 9/1972 | Keith et al. | 23/288 F |

Primary Examiner—Barry S. Richman
Assistant Examiner—Michael S. Marcus
Attorney, Agent, or Firm—Barry S. Bissell; Richard N. Wardell; Clarence R. Patty, Jr.

[57] ABSTRACT

A catalyst support for an exhaust gas purifier having a cylindrical, ceramic substrate with a helical groove on the periphery of the substrate and being contained within a cylindrical casing having a radially outward helical channel complimentarily aligned with the helical groove of the substrate, such that the helical groove and helical channel define a helical conduit between the casing and the substrate. A compressible wire mesh rope of cross-sectional area slightly larger than the cross sectional area of the helical conduit is compressed within the helical conduit along substantially the entire length of the helical conduit to apply a radial pressure on the substrate periphery, thereby fixing the position of the substrate while allowing thermal expansion of the substrate into an annular space between the casing and the substrate.

4 Claims, 1 Drawing Figure

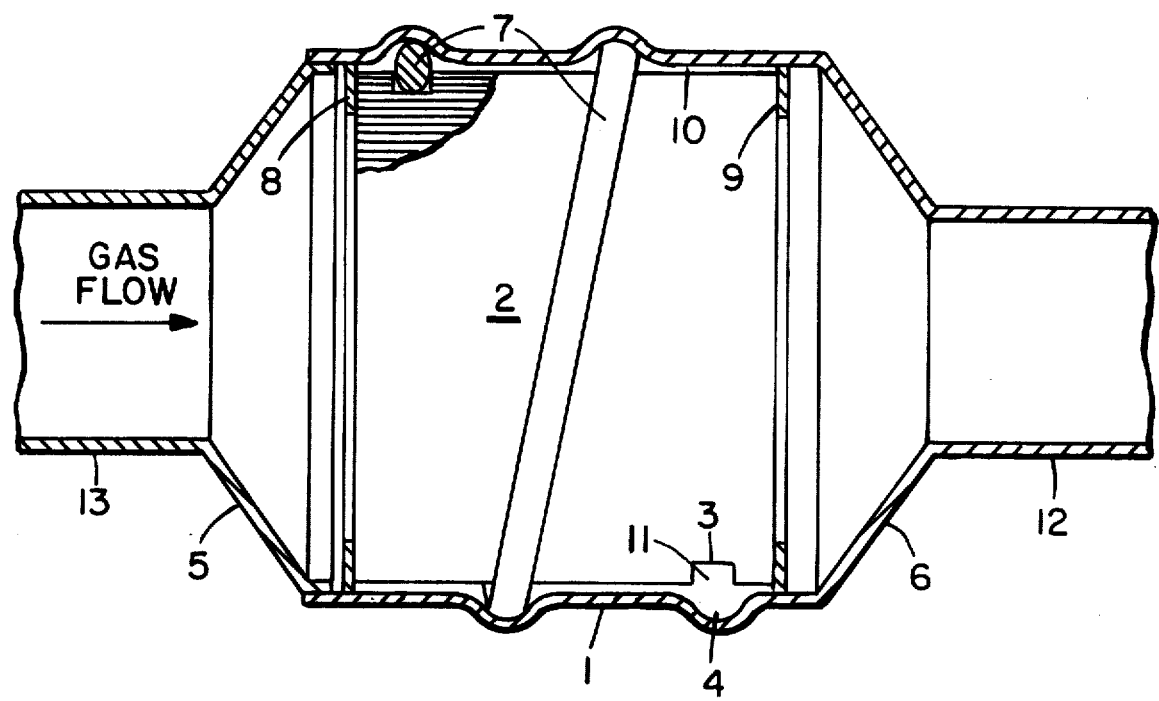

PRELOAD MEANS FOR CERAMIC SUBSTRATE IN EXHAUST GAS PURIFIERS

BACKGROUND OF THE INVENTION

The present invention relates to catalytic reactors for purifying exhaust gases from automobiles of the type having a cylindrical casing with gas inlets and gas outlets located on opposite ends of a cylindrical, honeycombed ceramic substrate which is coated with or contains a catalytically active substance and is contained within the cylindrical casing. The hot, polluted gases flow in the gas inlet, through the ceramic substrate and out the gas outlet. During the flow through the substrate, reactions are promoted by the catalytically active substance to eliminate the pollutants from the gas stream.

During the passage of hot gases, the ceramic substrate is subjected to thermal shock. One method to reduce the effect of the thermal shock on the physical integrity of the substrate is to groove the periphery of the substrate. This method is disclosed and explained in copending application Ser. No. 387,774, filed Aug. 13, 1973, (assigned to the assignee of this application).

SUMMARY OF THE INVENTION

It is an object of this invention to provide a means of securing a ceramic substrate in a catalytic reactor, while allowing the substrate freedom to thermally expand.

It is another object of this invention to provide a securing means which is readily assembled in the catalytic reactor.

In particular, it is the object of this invention to provide such a securing means as above described for a cylindrical ceramic substrate having a helical groove at the periphery of the substrate, the securing means allowing the reactor to be assembled by screwing the substrate into the casing.

In accordance with these objectives a cylindrical casing with a diameter slightly larger than the ceramic substrate is provided with a helical channel on the inner surface which is complimentarily aligned with the helical groove on the periphery of the substrate when the substrate is installed in the casing. A helical conduit formed at the casing-substrate interface by the helical groove and the helical channel is filled with a flexible, elongated, resilient compressed means which exerts a radial compression on the substrate periphery and holds the substrate laterally in place. The substrate may, however, expand during operation into the annular space remaining between the substrate and the casing.

The substrate may be assembled in the casing by wrapping the flexible wire mesh rope in the helical groove of the substrate and screwing the substrate into the casing. The substrate may then be positioned axially with respect to the casing by means of annular flanges secured to the casing at the ends of the substrate and overlapping the periphery of the substrate at each end. The flanges also serve to close the annular space between the substrate and the casing to the flow of hot gases.

DESCRIPTION OF THE DRAWING

The FIGURE is a section view of the cylindrical casing of the catalyst support structure illustrating the positioning of the substrate within the casing. The full view of the substrate shows the helical grooving and the breakaway section shows the substrate cells as well as the helical conduit and the wire mesh rope.

DETAILED DESCRIPTION OF A PREFERRED EMBODIMENT

The FIGURE illustrates the assembled catalytic reactor. The cylindrical ceramic substrate 2 is a monolithic honeycombed structure having a multiplicity of open-ended cells and thin walls extending from one end to the other end for passing the exhaust gases of an internal combustion engine. The substrate is coated with a catalytically active substance.

The monolithic ceramic substrate is subjected to thermal shock during the gas cleaning process. One method of improving the thermal shock resistance of the monolith is to groove the periphery of the substrate in a direction generally transverse to the axes of the cells. In particular, a helical groove may be cut around the cylindrical monolith and extended from near one end of the substrate to near the other end of the substrate. The invention of helically grooving a monolith is described in detail in the aforesaid copending application Ser. No. 387,774, which is incorporated herein by reference. The groove herein is at least 1/32 inch deep and between ½ and ⅜ inch wide in the substrate periphery. Preferably the groove is cut into only those substrate cells which have been closed off to the flow of hot gases at the end face of the substrate by flanges 8, 9 (in FIG. 1) or by other closure means. Execution of latter preference prevents hot gases from escaping from the ceramic substrate and coming in contact with the metal casing. Cutting through substantially all the cells which are shielded from the hot gases also prevents stresses in an axial direction on the substrate periphery which are normally caused by the thermal gradient set up between the cells exposed to the hot gases and the cells not exposed to the hot gases. Once again, this grooving of the substrate periphery is more fully explained in the copending application Ser. No. 387,774.

Beginning with the ceramic substrate 2, which contains a helical groove 3 at the periphery, a cylindrical casing 1 is fabricated with a slightly larger inside diameter than the substrate. The casing 1 may be fabricated with an end closure 6 on one end. The end closure 6 terminates in an outlet pipe 12. An end closure member 5 with inlet pipe 13 may be separately fabricated for assembly with the casing 1 after insertion of the ceramic substrate 2.

The cylindrical casing 1 is fabricated with a radially outward helical channel 4 on its inner surface in the same configuration as the helical groove 3 of the substrate so that when the substrate is located within the casing, the helical groove 3 and the helical channel 4 are complimentarily aligned to define a helical conduit 11 extending around the periphery of the substrate. In the assembly, a knitted-mesh wire rope 7 is disposed in the helical conduit 11 along substantially the entire length of the conduit. One method of assembling the catalytic reactor comprises, first, wrapping the knitted-mesh wire rope 7 around the substrate 2, and second, screwing the substrate into the casing 1 by having rope 7 slidably engage and pass along channel 4. The knitted-mesh wire rope 7 is compressed within the helical conduit 11 and therefore provides a radial pressure on the substrate 2 and prevents lateral movement. The wire mesh rope 7 does not prevent the thermal expansion of the substrate 2 into the annular space 10 between the substrate 2 and the casing 1 during operation of the catalytic reactor.

Annular flange 9 may be fixedly attached to the casing 1 prior to installation of the substrate 2 to fix the axial position of the substrate. Annular flange 8 may be fixedly attached to the casing 1 after the substrate 2 is installed to fix the axial position of the substrate. Flange 8 and flange 9 also serve as barriers to gas flow in the annular space 10 at the substrate - casing interface. End closure 5 may also be fixedly attached to the casing 1 after the substrate 2 is installed.

The cross section of the helical conduit may be any convenient shape. It may be circular, square, or rectangular and the half of the cross section formed by the helical groove in the substrate may be of a different shape than the half of the helical conduit cross-section formed by the helical channel in the casing. It is preferred that the helical conduit encircle the substrate at the substrate periphery, but that the helical groove in the substrate stop at least one-quarter of an inch short of each end face of the cylindrical substrate to prevent weakening of the structure at the edge of the end face.

Whatever the cross-sectional shape and area of the helical conduit, the knitted-mesh wire rope should have an uncompressed cross-sectional area slightly larger than the conduit both at room temperature and at operating temperature. When installed in the helical conduit, the wire mesh, under radial compression, applies a radial pressure to the ceramic substrate which hinders the lateral movement of the substrate in the casing. The substrate is still free, however, to expand under thermal processing associated with operation as a catalytic reactor.

What has been referred to as a knitted-mesh wire rope or a wire mesh rope may actually be any elongated resilient compressible material which may be fixed sufficiently compressed in the helical conduit and which will withstand the operating temperatures of the catalytic unit so as to remain elastic and in compression at the operating temperature. A knitted-mesh rope is convenient since it may be wrapped around the substrate prior to assembly in the casing. The wire mesh rope may be obtained directly or a flexible, knitted-mesh metal fabric may be rolled into a rope of the necessary cross-sectional area. It is preferred, although not required, that the wire mesh rope be a unitary piece extending from one end of the helical conduit to the other end of the helical conduit.

The operating temperatures referred to herein will vary across the catalytic unit. The center most portion of the substrate (exposed to the hot gases) may be expected to exceed 1,000°C. for periods of operation while the substrate periphery (not exposed to hot gases) may reach only 425°C. The wire mesh rope must therefore retain its necessary elastic properties up to at least 425°C.

EXAMPLE

A cylindrical cordierite monolithic substrate having 200 square, open-ended cells per square inch and cell walls of .010–.012 inches, may have a helical groove ¼ inch deep and ¼ inch wide at a helix angle of 5 from the plane perpendicular to the substrate axis in the direction of gas flow therethrough. The groove should begin and terminate at least one-quarter inch from the corresponding end of the substrate. Physical dimensions of the substrate are 4⅝ inch diameter and 3 inch length. The coefficient of thermal expansion may be on the order of $15 \times 10^{-7}/°C.$, over the temperature range 25°–1,000°C.

The cylindrical stainless steel casing may have an inside diameter of 5 inches, a length of 4 inches and a thickness of one-sixteenth inch. The helical channel with a radius of one-eighth inch, has a helix angle of 4° or other similar angle which is necessary to match the depression with the substrate groove. The helical conduit formed when the helical channel and the helical groove are aligned is about 9/16 inch high and ¼ inch wide.

A piece of Metex Corporation Inconel X-750 wire mesh rope, one-half inch in diameter and 36 inches long is then wrapped around the substrate and depressed into the helical groove, and the substrate is screwed into the casing. This particular alloy wire mesh rope has 256 mesh per square inch and an individual wire diameter of 0.0045 inch. The X-750 alloy has a melting point of greater than 1370°C. and comprises, on a weight basis, 14–17% Cr, 5–9% Fe, 2.25–2.75% Ti, 0.4–1.0% Al, 0.7–1.2% Cb, 0–1.0% Mn, less than 0.5% each of Si and Cu, less than .01% S and C, 1.0% CO, and the balance Ni.

The Inconel X-750 wire mesh will expand more than the cordierite at elevated temperatures, so that the compressive load on the substrate continues during use, despite any thermal expansion of the steel casing. In addition, the Inconel X-750 exhibits no creep for over 1,000 hours at 425°C. (its proposed operating temperature) when stressed at the level to be experienced in the reactor during operation. The elastic modulus for the alloy only drops from $31 (10^6)$ psi at 27°C. to $26 (10^6)$ psi at 425°C., thereby demonstrating the necessary retention of elasticity at elevated temperatures which results in continued compression on the substrate throughout the operation of the catalytic reactor.

What we claim is:

1. A catalytic converter comprising
   a. a cylindrical casing having a radially outward helical channel in the casing inner surface and first and second end closures on opposite ends of the casing terminating, respectively, in inlet and outlet pipes for allowing gas flow between opposite ends of the catalytic converter,
   b. a cylindrical, monolithic, honeycombed ceramic substrate having a plurality of open ended cells extending between opposite ends of the substrate and a catalytically active coating thereon, the substrate having a lesser diameter than and being contained axially within the casing, and further having a helical groove on the periphery of the substrate complementarily aligned with and defining a helical conduit with the radially outward helical channel in the casing,
   c. an elongated, resilient, flexible means slidable within the helical channel and being disposed and compressed within the helical conduit and having a greater cross-sectional area in an uncompressed state than the cross-sectional area of the helical conduit, but being compressible to yield a cross-sectional area lesser than the cross-sectional area of the conduit; the elongated, resilient, flexible means being capable of remaining elastic and in compression within the helical conduit at the operating temperatures of the catalyst support, and d. additional securing means fixed to the casing at opposite ends of the substrate for restricting the axial movement of the substrate in the casing and preventing the entrance of gases into an annular space between the casing and the substrate.

2. The catalytic converter as recited in claim 1 wherein the helical groove on the periphery of the substrate begins at least one-fourth inch from one face end of the substrate and terminates at least one-fourth inch from the other face end of the substrate.

3. The catalytic converter as recited in claim 1 wherein the elongated, resilient, flexible means is a wire mesh rope.

4. The catalytic converter as recited in claim 3 wherein the wire mesh rope is disposed within substantially the entire length of the helical conduit.

* * * * *

UNITED STATES PATENT OFFICE
CERTIFICATE OF CORRECTION

PATENT NO. : 3,892,537
DATED : July, 1, 1975
INVENTOR(S) : Suresh J. Gulati, Henry E. Hagy, John S. McCartney It is certified that error appears in the above-identified patent and that said Letters Patent are hereby corrected as shown below:

Column 3, line 42, after "mesh" insert -- wire --.

Column 3, line 65, after "5" insert -- degrees --.

Signed and Sealed this fourth Day of November 1975

[SEAL]

Attest:

RUTH C. MASON
Attesting Officer

C. MARSHALL DANN
Commissioner of Patents and Trademarks